(12) United States Patent  (10) Patent No.: US 8,719,292 B2
Nussel et al.  (45) Date of Patent: May 6, 2014

(54) INTERACTIVE SYSTEM FOR INTERNET INFORMATION RETRIEVAL AND EXPLORATION

(75) Inventors: Dale Nussel, Mahomet, IL (US); Allie K. Watfa, Urbana, IL (US)

(73) Assignee: Yahoo! Inc., Sunnyvale, CA (US)

( * ) Notice: Subject to any disclaimer, the term of this patent is extended or adjusted under 35 U.S.C. 154(b) by 456 days.

(21) Appl. No.: 12/247,156

(22) Filed: Oct. 7, 2008

(65) Prior Publication Data

US 2010/0088332 A1  Apr. 8, 2010

(51) Int. Cl.
*G06F 17/30* (2006.01)
*G06F 7/00* (2006.01)

(52) U.S. Cl.
USPC ............................ 707/766; 707/804; 705/7.32

(58) Field of Classification Search
CPC ................................................ G06F 17/30861
USPC ......... 707/759, 708, 727–728, 732–734, 738, 707/749–751, 767, 999.005, 999.003, 707/999.102, 999.01, E17.067, 805, 705, 707/726, 731, 766, 769, 770, 771, 774, 707/782; 715/854, 700, 745, 968, 958, 734, 715/738, 710, 727, 737, 780, 804, 809; 705/1.1, 7.32, 7.29, 7.31; 709/238, 239
See application file for complete search history.

(56) References Cited

U.S. PATENT DOCUMENTS

| | | | | |
|---|---|---|---|---|
| 5,797,001 A * | 8/1998 | Augenbraun et al. | ........... | 725/40 |
| 5,918,236 A * | 6/1999 | Wical | ............................ | 715/209 |
| 5,953,732 A * | 9/1999 | Meske et al. | ................... | 715/239 |
| 6,195,681 B1 * | 2/2001 | Appleman et al. | ............ | 709/203 |
| 6,993,721 B2 * | 1/2006 | Rosin et al. | .................... | 715/738 |
| 7,861,001 B2 * | 12/2010 | Allen et al. | ................... | 709/238 |
| 2005/0071216 A1 * | 3/2005 | Yoshitake et al. | .............. | 705/10 |
| 2005/0193020 A1 * | 9/2005 | Shkedi | ........................ | 707/104.1 |
| 2007/0192166 A1 * | 8/2007 | Van Luchene | ................... | 705/10 |
| 2008/0270389 A1 * | 10/2008 | Jones et al. | ........................ | 707/5 |
| 2008/0294584 A1 * | 11/2008 | Herz | ............................... | 706/46 |
| 2008/0319952 A1 * | 12/2008 | Carpenter et al. | ................ | 707/3 |
| 2009/0012887 A1 * | 1/2009 | Taub et al. | ...................... | 705/34 |

* cited by examiner

*Primary Examiner* — Greta Robinson
(74) *Attorney, Agent, or Firm* — Hickman Palermo Truong Becker Bingham Wong LLP

(57) ABSTRACT

A system and method for bringing potentially interesting web content to a user's attention in a faster and more interesting way. Embodiments are directed towards selecting for display at a client device news or facts that are relevant to a user's categorization of topics of interest or historical topics of interest. Topics maybe classified by a topic classifier and placed into different categories. Actions of the user on the client device are used to drive the interest content.

25 Claims, 7 Drawing Sheets

INTERACTIVE SYSTEM FOR INTERNET INFORMATION RETRIEVAL AND EXPLORATION

TECHNICAL FIELD

The present invention relates generally to selecting for display at a client device focused topics based on a user's interests, including current internet community highly popular topics. The popular ordering is updated in near real time.

DESCRIPTION OF RELATED ART

The problem with current web searches is that they are somewhat static in the way they interact with a user employing a client device. Also a user cannot investigate topics that they are not aware of or looking for. What is needed is a way for the latest news on various topics to be fed to the user based on what would interest them.

BRIEF DESCRIPTION OF THE DRAWING FIGURES

Non-limiting and non-exhaustive embodiments of the present invention are described herein with reference to the accompanying drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa.

The present invention provides a system and method for bringing potentially interesting web content contained on a server to a web enabled client device in an interactive way. A web content guide server may generate one or more questions to the user based on known current up to date news or facts. Based on the user's response, the web content guide server may choose to display information which may interest the user, and have the user redirected to the webpage. The invention may be carried out by computer-executable instructions, such as program modules. Advantages of the present invention will become apparent from the following detailed description.

Figure 1:
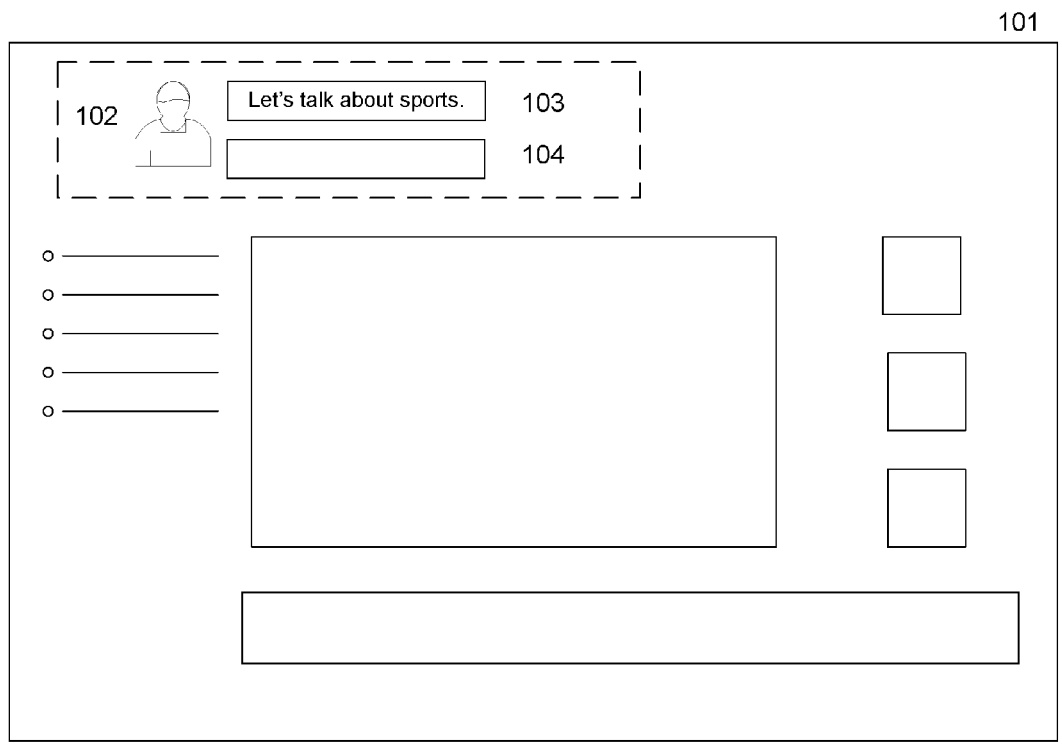
FIG. 1 illustrates a webpage with a web content guiding service according to one embodiment of the present invention.

FIG. 1 illustrates a webpage with a web content guiding service according to one embodiment of the present invention. As shown, a user may be looking at a webpage 101. An icon 102 for the web content guiding service may be displayed on the webpage 101. The web content guiding service may be activated or deactivated by the user. The web content guiding service may communicate with the user via text and/or audio, as customized by the user. In one embodiment, the web content guiding service may say to the user, "Hello, let's talk about sports" via a dialog window 103, and receive the user's response via an input method dialog window 104. The statement or question may be generated according to what the user is looking at, the user's proxies on the computer, or the user's profile. The web content guiding service may redirect the user to one or more webpages according to the user's response to the question.

Figure 2:
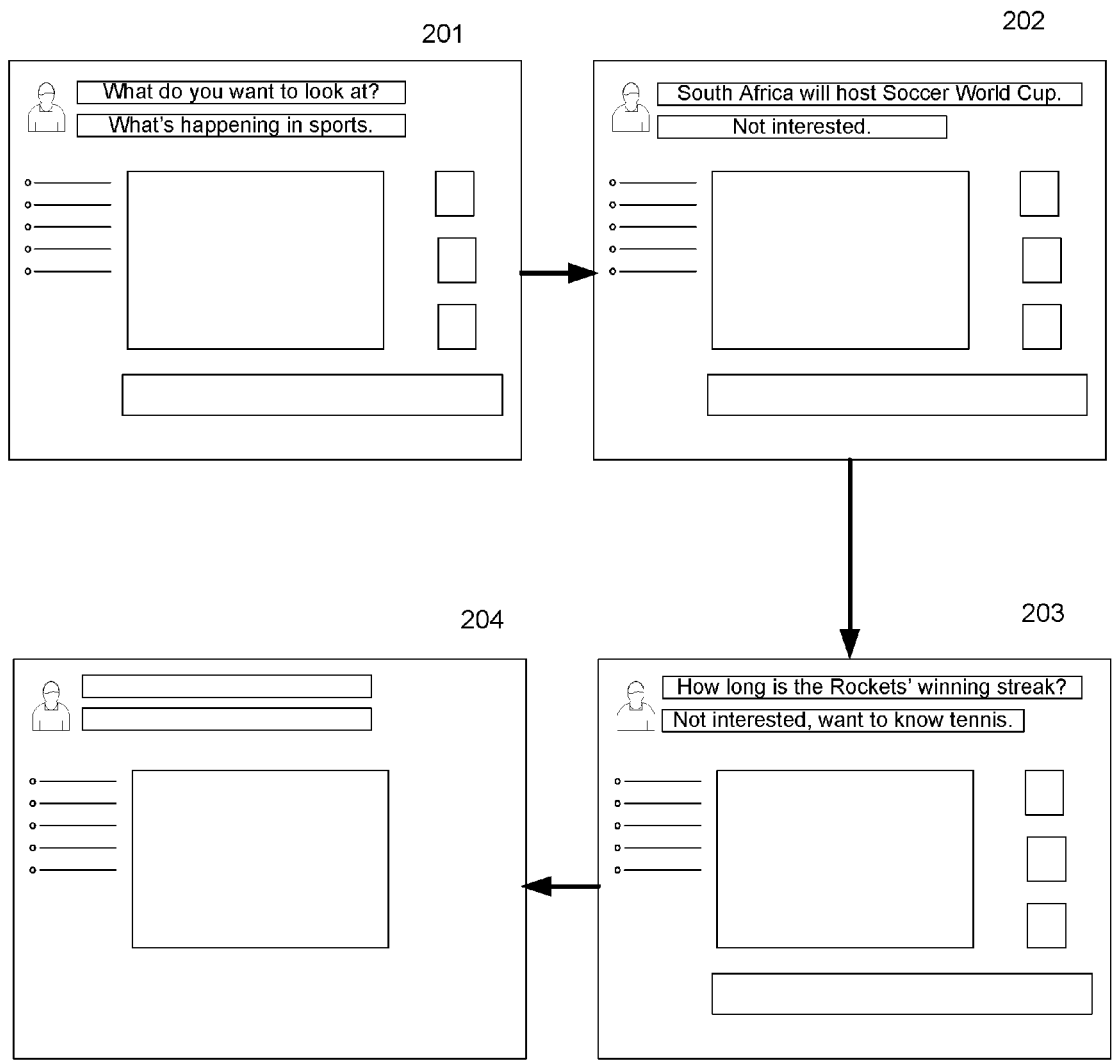
FIG. 2 illustrates interactions between a web content guiding service and a user according to one embodiment of the present invention.

FIG. 2 illustrates interactions between a web content guiding service and a user according to one embodiment of the present invention. The user may be looking at a webpage in which the web content guiding service is incorporated. At 201, the web content guiding service may ask the user, "What do you want to look at?" If the user's response is "What is happening in sports," then at 202, the web content guiding service may ask the user "Did you know that South Africa will host the FIFA World Cup?" If the user's response is "Not interested," at 203, the web content guiding service may ask the user another sports-related question, such as, "Do you know how long the Rockets' winning streak is?" If the user's response is "Not interested, I would like to know about tennis," then at 204, the user may be redirected to a webpage for tennis. The web content guiding service may present a new question, which may lead the user to another webpage.

Figure 3:
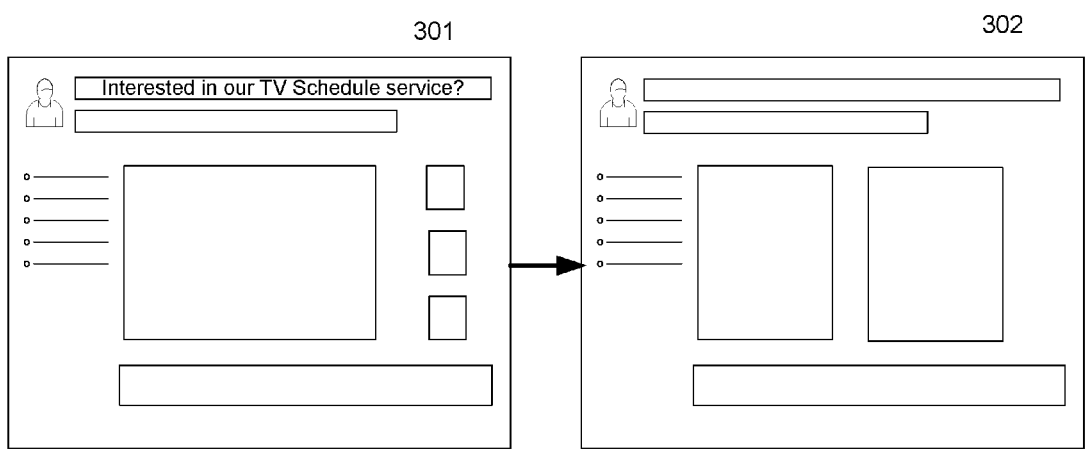
FIG. 3 illustrates interactions between the web content guiding service and a user according to one embodiment of the present invention.

FIG. 3 illustrates interactions between a web content guiding service and a user according to one embodiment of the present invention. A web service provider may track a user's browsing activities, infer the user's interest from his cookie files and build up a user profile. The web content guiding service may start a conversation with a user according to the user's profile. When the user is looking at the front page of a website, the web content guiding service may search the user's profile and find out that the user frequently browses web pages about TV shows, and the website recently started a TV Schedule service. At 301, the web content guiding service may ask the user in a dialog window, "Do you want to try our TV Schedule Service?" If the user answers yes, the web content guiding service may present the home page for the TV Schedule service to the user at 302.

Figure 4:
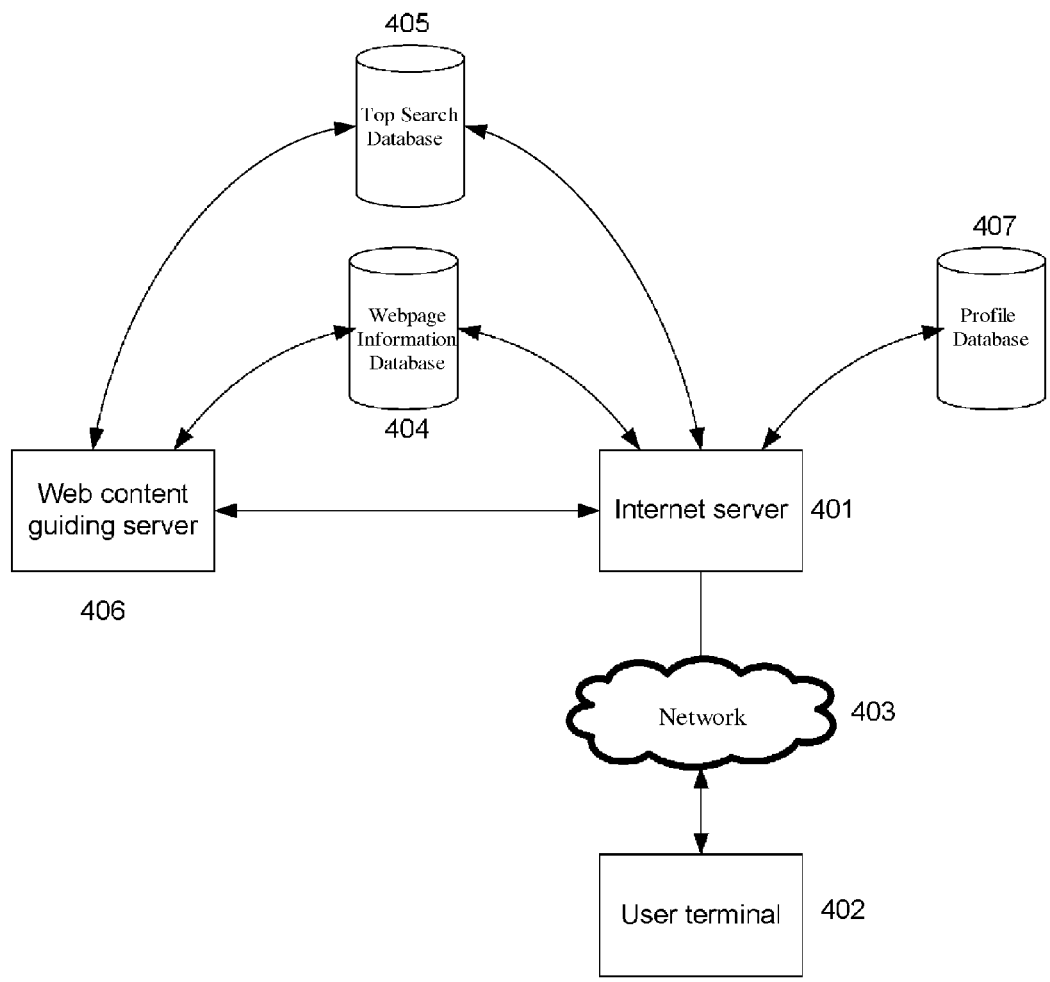
FIG. 4 illustrates a system for providing an interactive guide for Internet browsing according to one embodiment of the present invention.

FIG. 4 illustrates a system for providing an interactive guide for Internet browsing according to one embodiment of the present invention. As shown, one or more Internet servers 401 may communicate over a network 403 with one or more user terminals 402. The user terminal 402 may be a personal computer, a handheld or laptop device, another kind of microprocessor-based system, a set top box, or programmable consumer electronics. Each user terminal may be a computer system, which may include one or more of a screen, an input device, a speaker, a processing unit, memory devices, and a system bus coupling various components in the computer system. An operating system of the user terminal may respond to a user input by managing tasks and internal system resources and processing system data.

The Internet server 401 may be a computer system and may control the operation of a website. The Internet server 401 may access a number of databases to obtain information to be included in a webpage. In one embodiment, the Internet server 401 may obtain content from a webpage information database 404 to generate a general webpage. In one embodiment, the Internet server 401 may access a top search database 405 and display a "Today's Top Searches" block on the webpage. In one embodiment, the Internet server 401 may access a user profile database 407 to obtain a user's profile information and generate a personalized webpage for the user. The user profile database 407 may include information a user provided when he signed up to become a registered user of the website (e.g., his demographic information), his browsing history information, and his topics of interest inferred from his browsing history information.

The Internet server 401 may communicate with a web content guide server 406 to provide the web content guiding service. In one embodiment, when the Internet server 401 receives an HTTP input from a user, it may pass the HTTP input to the web content guide server 406, together with some information about the user, e.g., the IP address of his computer, or his profile information.

With the input, the web content guide server 406 may determine which question it may start with to lead the user to a webpage he may be interested in. In one embodiment, the web content guide server 406 may rank topics the user may be interested in and start with the one with the highest rank. In one embodiment, the web content guide server 406 may find out from the user's profile information that he is a tennis fan and may put "tennis" on the top of the list.

The web content guide server 406 may access a number of databases to generate a question to the user on the webpage he requested, so as to determine a webpage he may be interested in and have him redirected to that webpage. For example, if the web content guide server 406 determines from the HTTP input and the profile information that tennis may be the topic that the user is most likely to be interested in, it may search the webpage information database 404 for the current top tennis news and the most viewed topics about tennis, and/or the top search database 405 for the current most popular searches about tennis. The web content guide server 406 may also access other data, e.g., map data. The web content guide server 406 may then generate a question about tennis and add it to the webpage the user requested. The question may be, e.g., "Do you want to look at the Wimbledon schedule?" If the user's response is yes, the Internet server 401 may instruct the Internet server 401 to redirect the user to a webpage displaying the Wimbledon schedule.

If the user's response is no or the user does not respond to the question, the web content guide server 406 may recalculate a topic the user is most likely to be interested in, and generate the next question to the user. The process may repeat until the user answers yes to a question or the user turns off the service.

In one embodiment, instead of determining a topic a user is most likely to be interested in, the web content guiding server 406 may start with a general question, e.g., "What do you want to look at?" and present the next question based on the user's response. In one example, the user's response is "sports," and the web content guiding server 406 may determine from the user's profile the sports the user likes, and may ask questions to determine which sport he is most likely to be interested in now. For example, the web content guide server 406 may find out from the profile information that the user likes basketball, hockey and tennis, but only tennis has a big event now. It may start with a question about tennis, e.g., "Do you want to look at the Wimbledon schedule?" If the user's response is no, the web content guide server 406 may recalculate a topic that the user might be interested in. In one example, from the webpage information database 404 and the top search database 405, the web content guide server 406 may find out that basketball is involved in one of the top searches, and may present a question to the user, e.g., "Basketball?" If the user's answer is yes, the web content guide server 406 may instruct the Internet server 401 to redirect the user to a webpage about basketball. If the user's answer is no, the web content guide server 406 may present another question, e.g., "Hockey?"

If the user's answer is yes, the web content guide server 406 may instruct the Internet server 401 to redirect the user to a webpage about hockey. If the user's answer is no, the web content guide server 406 may present questions about other sports until it can select a webpage to present to the user, or the user turns off the service.

Although the Internet server 401 and the web content guide server 406 are displayed as two separate servers, their functions may be performed by one computer system. Similarly, databases 404 and 405 may be combined into one database.

Figure 5:
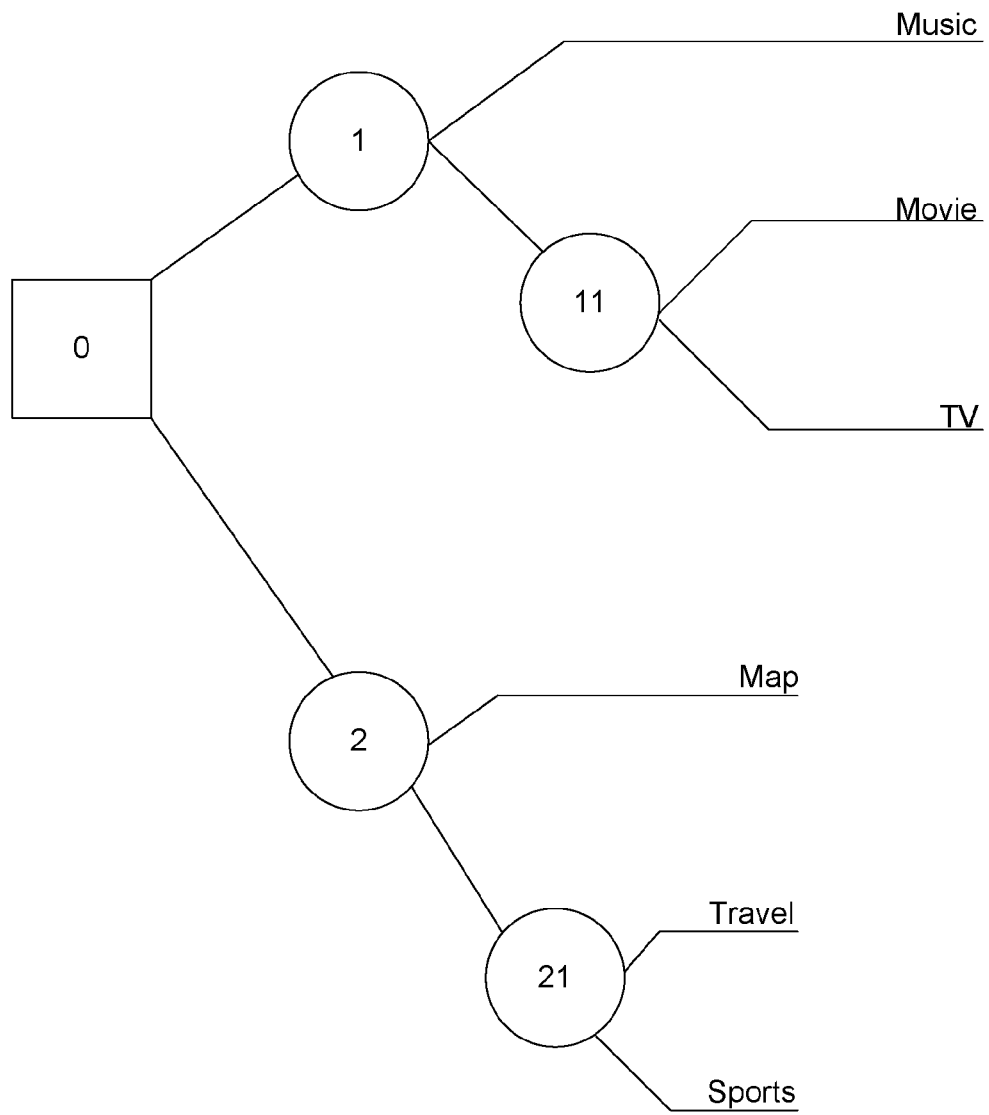
FIG. 5 illustrates a decision tree for determining a topic of interest according to one embodiment of the present invention.

In one embodiment, the web content guide server 406 may use tree structure artificial intelligence in determining questions to the presented. FIG. 5 illustrates a decision tree used to decide a topic of interest according to one embodiment of the present invention. As shown, "0" may represent a start page, a line may represent an interaction with a user (e.g., a question or an answer), and a leaf may represent a decision. A website may have a number of web pages, e.g., Movies, TV, Music, Sports, Travel and Maps. To find out which webpage the user may be interested in, the web content guide server 406 may start with a question "Entertainment?" If the user's response is yes, the web content guide server 406 may determine that the user is interested in Movies, TV, or music, but may need to present another question to find out which one. The web content guide server 406 may present a question "Music?" to the user. If the user responds with "yes," the web content guide server 406 may instruct the Internet server 401 to redirect the user to the Music webpage. Otherwise, the web content guide server 406 may present a question "Movies?" to the user, and instruct the Internet server 401 to redirect the user to either the Movies webpage or the TV webpage according to the user's response.

If the user is not interested in entertainment, the web content guide server 406 may present questions like "Maps?" or "Sports?" or "Travel?" to find out what the user may be interested in, and have the user redirected to the webpage.

The tree structure may be the same for all users, or may be personalized according to the user's profile. In addition, the web content guide server 406 may take a user's profile information in consideration and start questions from any point in the tree. For example, if a user often downloads music, the first question presented to him may be "Music?" instead of "Entertainment?"

Figure 6:
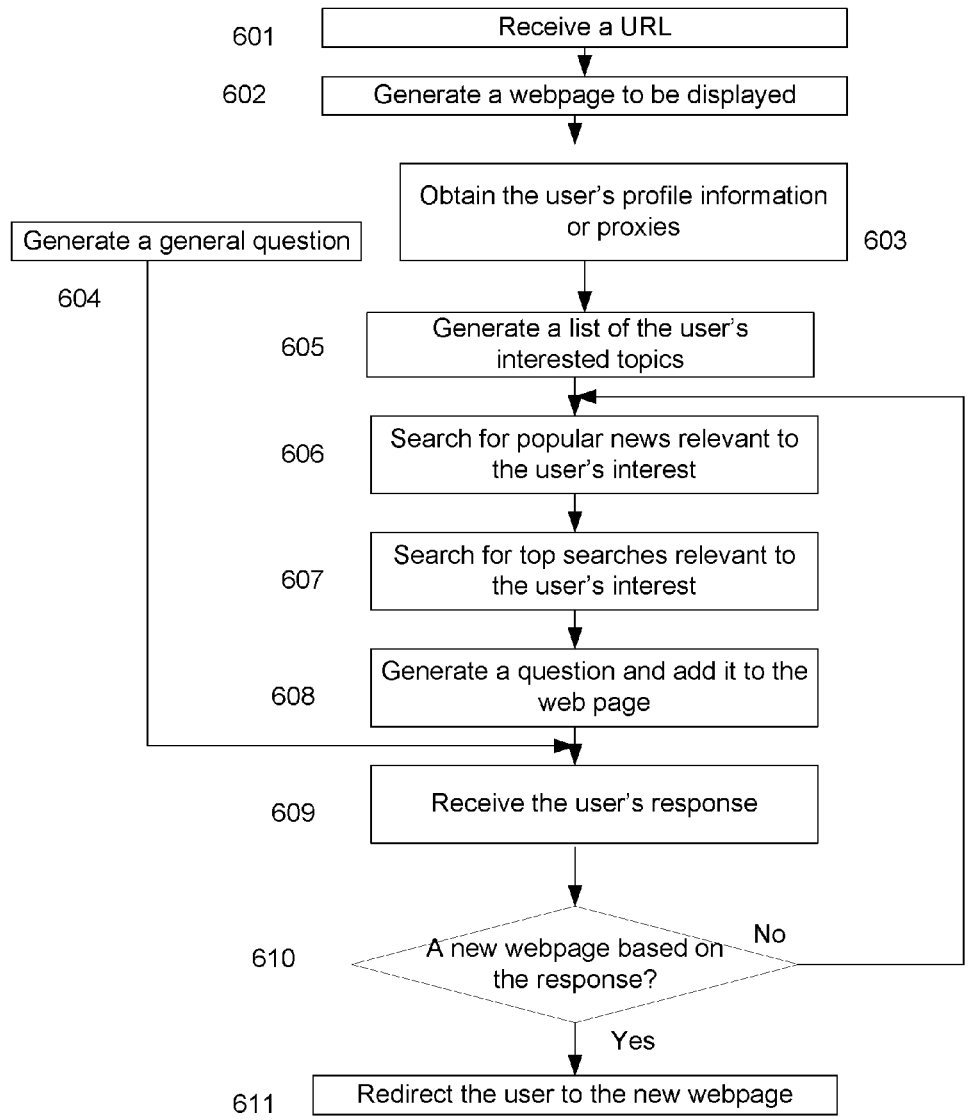
FIG. 6 illustrates a flowchart of a method for providing an interactive guide for Internet browsing according to one embodiment of the present invention.

FIG. 6 illustrates a flowchart of a method for providing an interactive guide for Internet browsing according to one embodiment of the present invention. The method may be used in the system shown in FIG. 4 and with the decision tree shown in FIG. 5.

At 601, a user may type a URL in his browser and request to look at a webpage.

At 602, the Internet server 401 may start to generate a webpage in response to the user's request. The Internet server 401 may obtain current top searches from the database 405 and add them to the webpage to be presented, and/or obtain the most view topics from the database 404 and add them to the webpage to be presented.

At 603, the Internet server 401 may obtain the IP address of the user's computer and use the IP address to obtain the user's profile information and/or Web Page proxies on the computer, from the database 407 and forward it to the web content guide server 406 together with the URL request.

At 604, the web content guide server 406 may generate a question to the user, so that it can use the user's response to determine which topic may interest the user. The web content guide server 406 may start with a general question, e.g., "What do you want to look at?"

Alternatively, the web content guide server 406 may generate a user specific question. At 605, the web content guide server 406 may generate a list of topics of interest of the user from the user profile information.

At 606, the web content guide server 406 may search the database 404 for the current most viewed topics that may be relevant to the user's interest, from the top of the list of topics of interest.

At 607, the web content guide server 406 may search the database 405 for the top searches that may be relevant to the user's interest, from the top of the list of topics of interest.

At 608, the web content guide server 406 may return a question to the Internet server 401, so that it can add the question to the webpage to be presented to the user.

At 609, the Internet server 401 may receive the user's response to the question and send it to the web content guide server 406.

At 610, the web content guide server 406 may determine whether it can find out a webpage the user may be interested in from the user's response. If yes, it may instruct the Internet server 401 to redirect the user to that webpage at 611. Otherwise, the procedure may return to 606 to generate another question for the user. 606 to 610 may repeat until the web content guide server 406 can find out a webpage that the user may be interested in. As described with respect to FIGS. 4 and 6, the web content guide server 406 may use an artificial intelligence tree structure to determine the question(s) to the user. The procedure may stop immediately if the user turns off the service.

The flowchart is only used as an example, and is not intended to limit the sequence of the steps, e.g., 607 may be performed before 606.

Figure 7:
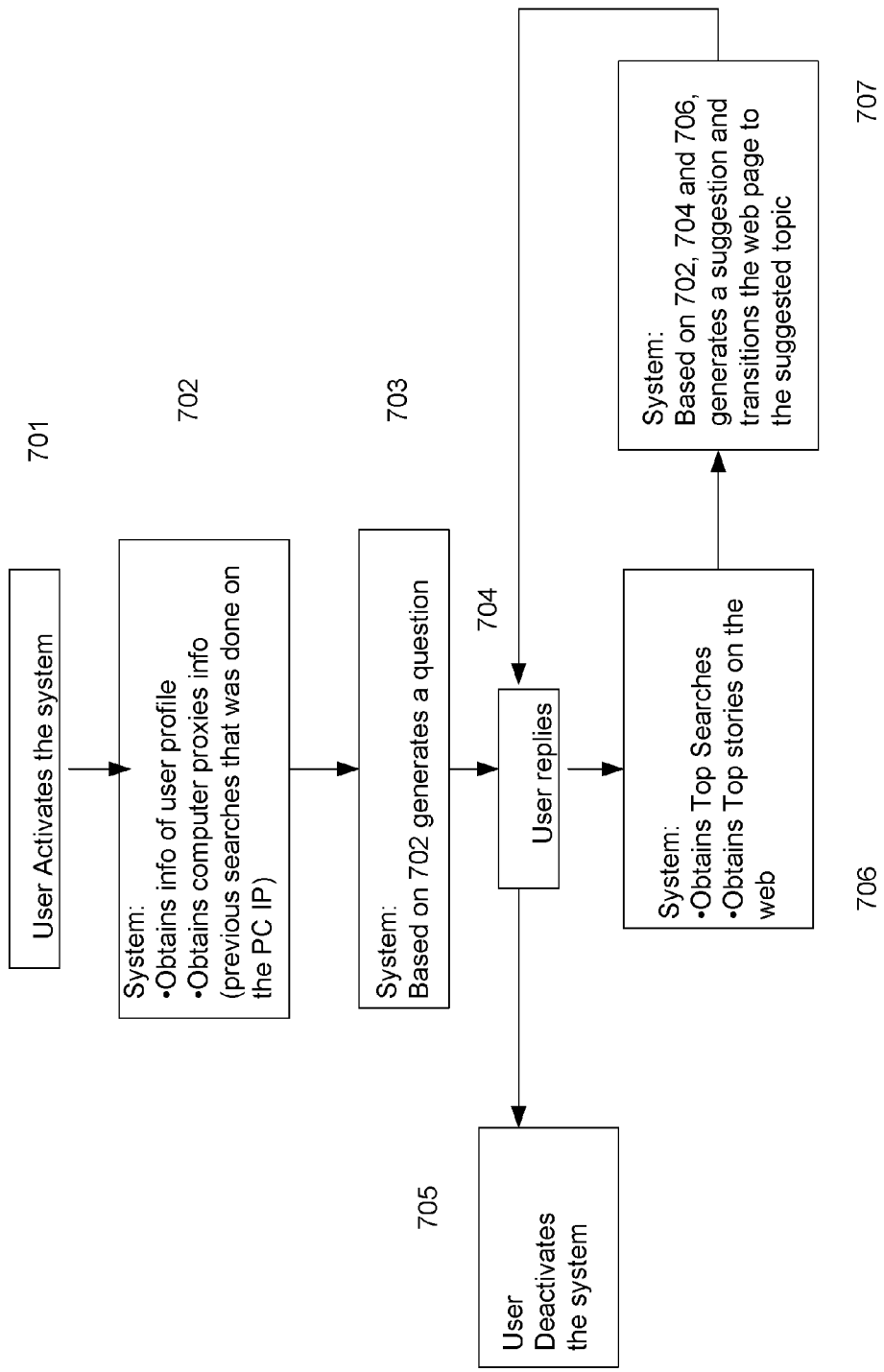
FIG. 7 illustrates a flowchart of a method for providing an interactive guide for Internet browsing according to one embodiment of the present invention.

FIG. 7 illustrates a flowchart of a method for providing an interactive guide for Internet browsing according to one embodiment of the present invention.

At 701, an input to activate the interactive guide may be received.

At 702, a user's profile information may be obtained. In one embodiment, the use's computer proxies information, or previous searches associated with the computer IP address, may also be obtained.

At 703, a question may be generated based on information obtained at 702.

At 704, a user response may be received. If the user response is to deactivate the interactive guide, the process may end at 705.

If the response is an answer to the question, top searches and top stories related to the answer may be obtained at 706. Based on information obtained at 702, 704 and 706, a suggested topic may be generated and the user may be redirected to a webpage related to the suggested topic at 707.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed as new and desired to be protected by a Patent of the United States is:

1. An interactive method for information retrieval, said method comprising:
   in response to receiving, from a user, a URL that corresponds to a first web page, performing the steps of:
      based on the URL, obtaining the first web page from a server;
      after obtaining the first web page from the server, generating, by a system, one or more first questions that are not contained in the first web page that was received from the server,
      generating, by the system, a modified version of the first web page by adding the one or more first questions to the first web page, wherein the one or more first questions include a particular question, and
      sending the modified version of the first web page to the user;
   wherein the system is configured to:
      (a) cause the user to be redirected to a new web page that is different than the first web page in response to receiving a first answer to the particular question, and
      (b) cause the user to be presented with one or more additional questions in response to receiving a second answer to the particular question;
   in response to receiving, from the user, one or more first responses to the one or more first questions, the system determining, based on the one or more first responses, whether to:
      cause the user to be presented with the one or more additional questions, or
      cause the user to be redirected to the new web page that is different than the first web page;
   in response to the system determining that the one or more first responses correspond to the second answer, the system causing the user to be presented with the one or more additional questions;
   in response to the system determining that the one or more first responses correspond to the first answer, the system causing the user to be automatically redirected to the new web page;
   wherein the method is performed by one or more computing devices.

2. The method of claim 1, further comprising using an artificial intelligence tree structure to determine whether to cause the user to be presented with the one or more additional questions, or cause the user to be redirected to the new web page that is different than the first web page.

3. The method of claim 1, wherein adding the one or more first questions to the first web page is performed by adding an audio representation of the one or more first questions to the first web page.

4. The method of claim 1, wherein adding the one or more first questions to the first webpage causes the one or more first questions to be presented to the user within a dialog window.

5. The method of claim 1, wherein the one or more first questions are generated based, at least in part, on one or more of a) a profile of the user or b) one or more proxies of the user.

6. The method of claim 5, further comprising generating a list of one or more topics of interest of the user and wherein generating the one or more first questions is based, at least in part, on the list.

7. The method of claim 5, further comprising performing a search for popular news relevant to one or more interests of the user and wherein generating the one or more first questions is based, at least in part, on a result of the search.

8. The method of claim 5, further comprising locating top searches relevant to one or more interests of the user and wherein generating the one or more first questions is based, at least in part, on the top searches.

9. The method of claim 1 wherein:
based on the one or more first responses, the one or more additional questions are presented to the user,
the one or more additional questions include a second particular question,
the system is configured to:
 (a) cause the user to be redirected to a second new web page that is different than the new web page in response to receiving a third answer to the second particular question, and
 (b) cause the user to be presented with second one or more additional questions in response to receiving a fourth answer to the second particular question,
and the method further comprises:
in response to receiving, from the user, one or more second responses to the one or more additional questions, the system determining, based on the one or more second responses, whether to:
 cause the user to be presented with the second one or more additional questions, or
 cause the user to be redirected to the second new web page that is different than the new web page;
in response to the system determining that the one or more second responses correspond to the fourth answer, the system causing the user to be presented with the second one or more additional questions;
in response to the system determining that the one or more first responses correspond to the third answer, the system causing the user to be automatically redirected to the second new web page.

10. A system for providing an interactive guide for information retrieval, the system comprising:
one or more processors;
a memory storing instructions which, when executed by the one or more processors, cause the one or more processors to perform:
 in response to receiving, from a user, a URL that corresponds to a first web page, performing the steps of:
  based on the URL, obtaining the first web page from a server;
  after obtaining the first web page from the server, generating, by the system, one or more first questions that are not contained in the first web page that was received from the server,
  generating, by the system, a modified version of the first web page by adding the one or more first questions to the first web page, wherein the one or more first questions include a particular question, and
  sending the modified version of the first web page to the user;
wherein the system is configured to:
 (a) cause the user to be redirected to a new web page that is different than the first web page in response to receiving a first answer to the particular question, and
 (b) cause the user to be presented with one or more additional questions in response to receiving a second answer to the particular question;
in response to receiving, from the user, one or more first responses to the one or more first questions, the system determining, based on the one or more first responses, whether to:
 cause the user to be presented with the one or more additional questions, or
 cause the user to be redirected to the new web page that is different than the first web page;
in response to the system determining that the one or more first responses correspond to the second answer, the system causing the user to be presented with the one or more additional questions;
in response to the system determining that the one or more first responses correspond to the first answer, the system causing the user to be automatically redirected to the new web page.

11. The system of claim 10, further comprising instructions for using an artificial intelligence tree structure to determine whether to cause the user to be presented with the one or more additional questions, or cause the user to be redirected to the new web page that is different than the first web page.

12. The system of claim 10, wherein adding the one or more first questions to the first webpage causes the one or more first questions to be presented to the user within a dialog window.

13. The system of claim 10, wherein the one or more first questions are generated based, at least in part, on one or more of a) a profile of the user or b) one or more proxies of the user.

14. The system of claim 13, wherein the instructions include instructions for generating a list of one or more topics of interest of the user and wherein generating the one or more first questions is based, at least in part, on the list.

15. The system of claim 13, wherein the instructions include instructions for performing a search for popular news relevant to one or more interests of the user and wherein generating the one or more first questions is based, at least in part, on a result of the search.

16. The system of claim 13, wherein the instructions include instructions for locating top searches relevant to one or more interests of the user and wherein generating the one or more first questions is based, at least in part, on the top searches.

17. The system of claim 10, wherein the instructions for adding the one or more first questions to the first web page include instructions for adding an audio representation of the one or more first questions to the first web page.

18. A computer program product comprising a non-transitory computer-readable medium having instructions which, when executed by a computer, perform an interactive method for information retrieval, said method comprising:
- in response to receiving, from a user, a URL that corresponds to a first web page, performing the steps of:
  - based on the URL, obtaining the first web page from a server;
  - after obtaining the first web page from the server, generating, by a system, one or more first questions that are not contained in the first web page that was received from the server,
  - generating, by the system, a modified version of the first web page by adding the one or more first questions to the first web page, wherein the one or more first questions includes a particular question, and
  - sending the modified version of the first web page to the user;
- in response to receiving, from the user, one or more first responses to the one or more first questions, the system determining, based on the one or more first responses, whether to:
  - cause the user to be presented with the one or more additional questions, or
  - cause the user to be redirected to the new web page that is different than the first web page;
- in response to the system determining that the one or more first responses correspond to a second answer, the system causing the user to be presented with the one or more additional questions;
- in response to the system determining that the one or more first responses correspond to a first answer, the system causing the user to be automatically redirected to the new web page.

19. The computer program product of claim 18, wherein the one or more first questions are generated based, at least in part, on one or more of a) a profile of the user or b) one or more proxies of the user.

20. The computer program product of claim 19, further comprising instructions for generating a list of the one or more topics of interest of the user and wherein generating the one or more first questions is based, at least in part, on the list.

21. The computer program product of claim 19, further comprising instructions for performing a search for popular news relevant to one or more interests of the user and wherein generating the one or more first questions is based, at least in part, on a result of the search.

22. The computer program product of claim 19, further comprising instructions for locating top searches relevant to one or more interests of the user and wherein generating the one or more first questions is based, at least in part, on the top searches.

23. The computer program product of claim 18, further comprising instructions for using an artificial intelligence tree structure to determine whether to cause the user to be presented with the one or more additional questions, or cause the user to be redirected to the new web page that is different than the first web page.

24. The computer program product of claim 18, wherein adding the one or more first questions to the first web page is performed by adding an audio representation of the one or more first questions to the first web page.

25. The computer program product of claim 18, wherein adding the one or more first questions to the first webpage causes the one or more first questions to be presented to the user within a dialog window.

* * * * *